Sept. 20, 1949.   E. LAXO   2,482,677
CAN TESTER VALVE MECHANISM
Filed Aug. 1, 1947

INVENTOR.
Ed Laxo

BY

Mellin & Hanscom
ATTORNEYS

Patented Sept. 20, 1949

2,482,677

UNITED STATES PATENT OFFICE 2,482,677

CAN TESTER VALVE MECHANISM

Ed Laxo, Oakland, Calif., assignor to Atlas Imperial Diesel Engine Co., Oakland, Calif., a corporation of Delaware Application August 1, 1947, Serial No. 765,484

5 Claims. (Cl. 73—40)

The present invention relates to automatic can testers, being particularly directed to the tester valve mechanism for controlling the passage of air under pressure to and from the cans during the testing operation.

An object of the present invention is to provide a can tester valve mechanism for controlling the flow of compressed air successively to and from cans mounted on the tester carrier wheel in which the valve mechanism embodies a stationary member in slidable sealing engagement with a member rotating with the wheel, and in which the sealing engagement between such members is maintained without subjecting the stationary member to the rotational force of the wheel.

Another object of the invention is to provide an improved can tester valve mechanism for controlling the flow of compressed air successfully to and from cans mounted on the tester wheel, which is readily adjustable to determine the sealing force between the contacting faces of a stationary valve member and a valve member connected to the rotatable tester wheel.

One form which the invention may assume is exemplified in the following description and illustrated by way of example in the accompanying drawings, in which.

Figure 1:
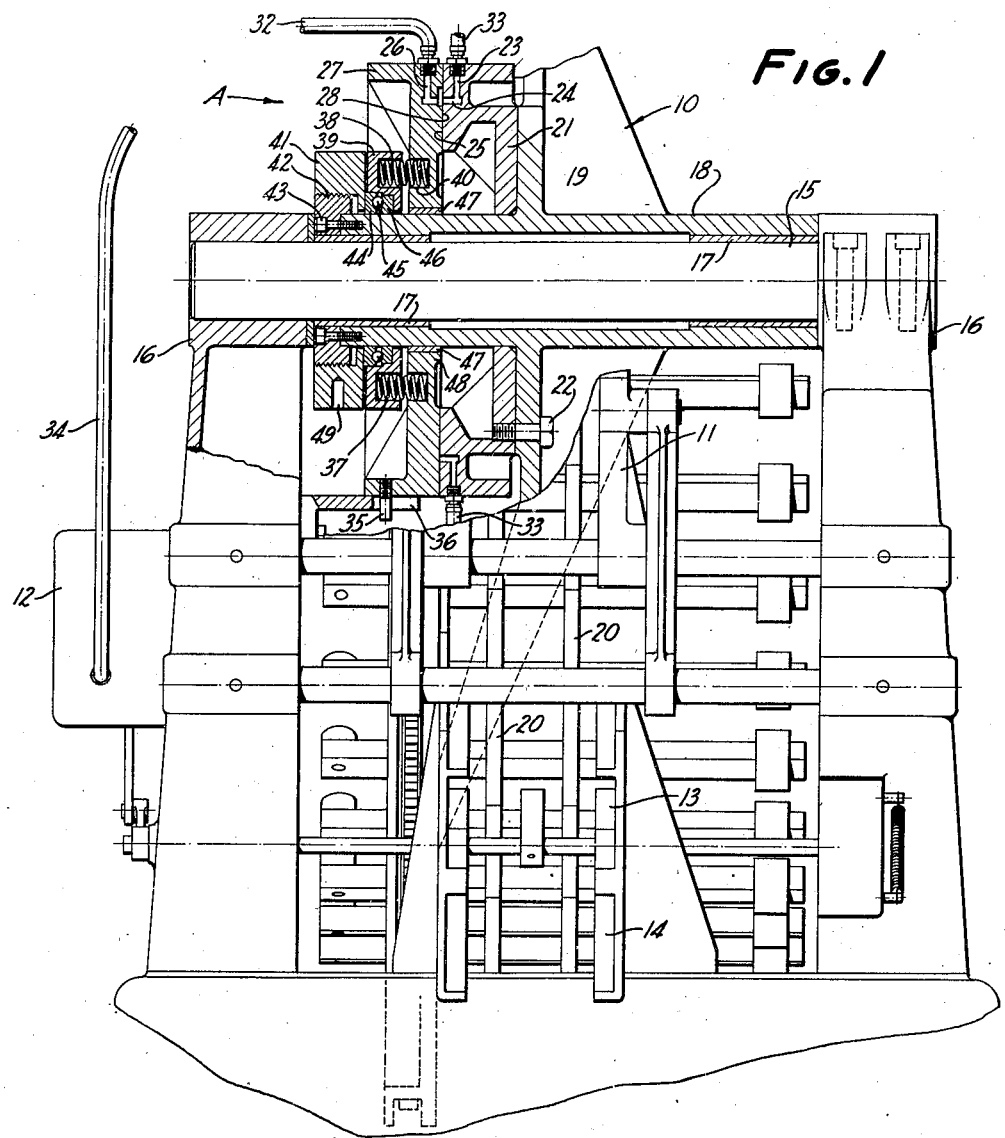
Fig. 1 is a partial side elevation and sectional view of a can tester.

The valve mechanism A disclosed in the drawings determines the passage of compressed air to cans mounted upon a can carrier wheel 10. In general, the testing operation includes the delivery of cans from an intake or feed chute 11 to the wheel, clamping of such cans in circumferentially arranged pockets adjacent the periphery of the wheel, the introduction of compressed air into such cans, and the determination of the fact of air leakage, if any, from the cans by a detecting mechanism 12, which effects selective discharge of the cans into a good can chute 13 or a poor can chute 14 upon unclamping of the cans from the wheel. In general, the mechanism for performing the aforenoted operations is well known in the art, and such general combination forms no part of the present invention, which is confined to the structure of the valve mechanism A and its arrangement with respect to the can carrier wheel 10. Specific descriptions of one form of tester may be found in my application for "Can tester pocket assembly," Serial No. 765,483, filed August 1, 1947.

The can carrier wheel 10 is rotatably mounted upon a stationary shaft 15 clamped within and extending between spaced vertical supports 16 of the tester frame. Friction between the wheel and shaft may be minimized by an intervening bushing 17 disposed within the hub 18 of the wheel and mounted upon the shaft. The wheel has a web portion 19 extending transversely from its hub, and a series of circumferentially arranged pockets 20 into which the cans are delivered successively from the intake or feed chute 11 as the wheel rotates, and in which they are clamped in leakproof relation, as set forth in my aforesaid application.

Figure 2:
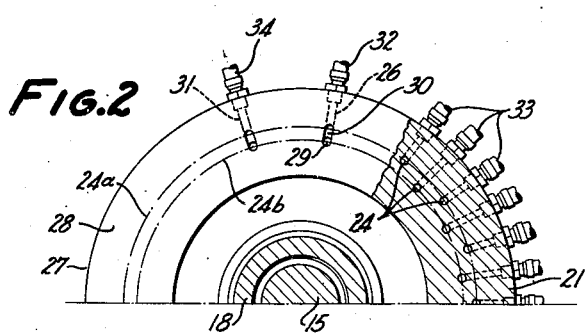
Fig. 2 is a transverse view of part of the tester valve mechanism, a portion being shown in section to illustrate the port arrangement.

A rotating valve member or disk 21 is mounted adjacent the web 19 of the wheel and is rigidly secured thereto in any suitable manner, as bolts 22. This valve member 21 has a plurality of uniformly spaced, circumferentially arranged radial L-shaped air passages or ducts 23 whose longitudinal foot portions 24 open outwardly of the flat transverse valve member face 25. There is an air passage 23 for each can pocket 20 on the wheel, and such air passages are spaced the same number of degrees apart around the circumference of the wheel as the pockets. In view of space limitations, it is preferred that the foot portions 24 of the air passages be alternately arranged on two different concentric circles 24a, 24b, as shown in Fig. 2.

Air is conducted successively to each air passage through a single air inlet duct 26 extending radially inwardly from the periphery of a stationary valve member 27 mounted upon the hub 18 of the carrier wheel 10, and having an inner flat transverse face 28 in snug sealing engagement with the companion face 25 on the rotatable valve member 21. The inner portion 29 of this air duct extends longitudinally and opens outwardly of the transverse face 28, merging into a depending radial groove 30 extending across both concentric circles 24a, 24b, on the rotating valve member, in order to successively feed air through the passages 23 during rotation of the can carrier wheel 10. Arranged in the stationary valve member almost a complete circle from the inlet duct is a detector air duct 31 similar to the inlet air duct 26. For example, such detector duct may be disposed approximately 330 degrees from the intake duct.

Air is supplied to a suitable compressed air tank by a compressor (both not shown) and flows through a feed line 32 to the inlet air duct 26 on the stationary valve member 27. Such air duct is so disposed on the stationary member 27 with respect to the can carrier wheel 10 that the rotating air passages 23 successfully communicate with the inlet duct 26 immediately after their associated cans have been clamped in leakproof relation in a pocket 20 on the can carrier wheel to direct air under pressure to the cans through suitable flexible intervening tubes or lines 33. As rotation of the wheel continues, each air passage 23 successively moves from communicating with the inlet duct 26 and traps the air in the particular can connected to such passage. After the can carrier wheel has rotated from the position of air entry almost one complete revolution (330 degrees in the above example), each air passage 23 then communicates with the detector air duct 31, communicating through a line 34 with a detector mechanism 12 having the function of determining the discharge of the can into the good can chute 13 or poor can chute 14 following its release or unclamping from the can carrier wheel 10 immediately after the associated air passage 23 has passed the detector air duct 31. This action takes place successively on each can as the wheel rotates, carrying the rotatable valve member 21 along the stationary valve member 27.

The stationary valve member 27 is prevented from rotating by pin 35 thereon engageable in a longitudinally extending key-way or groove 36 in a side frame member 16 of the tester mechanism. The pin thus prevents rotation of the stationary valve member, but permits its longitudinal movement, the pin 35 and groove 36, in effect, providing a slidable keyed or spline connection between the stationary valve member and the tester frame.

The stationary member 27 is urged longitudinally against the rotating valve member 21 to hold their coengaging flat faces 28, 25, in snug sealing, air-tight relationship by a plurality of circumferentially arranged compressed springs 37, each of which is received within a pocket 38 in a spring ring or retainer 39, and also within an opposed pocket or socket 40 in the stationary valve member 27. The springs are held under compression by a thrust collar 41 threaded upon a cap or sleeve 42 secured to the end of the carrier wheel hub 18 by cap screws 43 or the like. The inner end of the collar 41 is secured to an outer bearing race 44 engaging a series of rotatable thrust bearing balls 45 engaging a companion bearing race 46 secured to the spring retainer ring 39. It is evident that the thrust of the springs 37 is transmitted in one direction to the thrust collar 41, sleeve 42 and hub 18 of the carrier wheel 10 through the anti-friction thrust bearing 44, 45, 46. It is also to be noted that a bushing 47 or other suitable radial type of bearing is positioned between the hub 18 of the carrier wheel and the hub 48 of the stationary valve member, in order to prevent the rotation of the carrier wheel 10 from materially tending to rotate the stationary valve member 27.

By suitably turning the thrust collar 41 on the sleeve 42 secured to the wheel hub 18, as by means of a rod positioned within a radial socket 49 in the collar, the compression in the springs 37 may be adjusted to the desired value to insure proper slidable sealing contact between the flat faces 28, 25 of the stationary and rotatable valve members 27, 21. The axial movement of the stationary member 27, under the impetus of the springs, is permitted, as aforementioned, by reason of its splined connection 35, 36 with the tester frame 16.

The rotation of the carrier wheel 10 does not tend to rotate the stationary valve member 27 in view of the radial anti-friction bearing 47 between the hub 18 of the carrier wheel and the stationary member, and also because of the axial thrust bearing 44, 45, 46 located between the spring retainer 39 and the thrust collar 41 threaded on the hub cap 42. Thus, the rotatable position of the stationary valve member with respect to the rotatable valve member is maintained, without any tendency toward altering the timed relationship between the ducts 26, 31 and 23. The springs 37 maintained the lapped coengaging faces 28, 25 of the valve members in snug sealing engagement to prevent inadvertent leakage of air from the air passages, such engagement being varied readily through threadedly adjusting the thrust collar 41 on the hub cap 42, which adjusting motion is transmitted through the thrust bearing 44, 45, 46 and retainer 39 to the springs 37.

It is accordingly apparent that a can tester valve mechanism has been provided for efficiently and effectively determining the passage of air to and from the cans clamped upon a tester wheel, in which the sealing engagement between the valve members is maintained without subjecting the stationary member to the rotational force of the wheel, and in which the force of sealing engagement may be readily varied.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A can tester, including a wheel for carrying cans from an intake chute to a discharge chute, a stationary valve member mounted on said wheel and having air passages opening through a sealing face on said member, a valve device rotatable with said wheel adjacent said member and having air passages opening through a sealing face on said device which are communicable with said stationary member passages as said wheel rotates to determine the supply and condition of air in cans clamped in leakproof relation on said wheel, a thrust member secured to said wheel, spring means for urging said stationary member toward said valve device in order to hold said faces in slidable sealing engagement with each other, and a thrust bearing between said thrust member and spring means for preventing the rotation of said wheel from being imparted to said stationary member.

2. A can tester, including a wheel for carrying cans from an intake chute to a discharge chute, a stationary valve member mounted on said wheel and having air passages opening through a sealing face on said member, a valve device rotatable with said wheel adjacent said member and having air passages opening through a sealing face on said device which are communicable with said stationary member passages as said wheel rotates to determine the supply and condition of air in cans clamped in leakproof relation on said wheel, a thrust member secured to said wheel, a thrust bearing engaging said thrust member, a retainer engaging said thrust bearing, and springs between said retainer and stationary member for urging said stationary member toward said valve device in order to hold said faces in slidable sealing engagement with each other.

3. A can tester, including a wheel for carrying cans from an intake chute to a discharge chute, said wheel having a hub, a stationary valve member mounted on said hub and having air passages opening through a sealing face on said member, a bearing between said member and hub, a valve device rotatable with said wheel adjacent said member and having air passages opening through a sealing face on said device which are communicable with said stationary member passages as said wheel rotates to determine the supply and condition of air in cans clamped in leakproof relation on said wheel, a thrust member secured to said hub, a thrust bearing engaging said thrust member, a retainer engaging said thrust bearing, and springs located between and bearing against said retainer and stationary member for urging said stationary member toward said valve device in order to hold said faces in slidable sealing engagement with each other.

4. A can tester as defined in claim 3, wherein said thrust member is threadedly secured to said hub to allow its adjustment thereon for the purpose of varying the force exerted by said springs.

5. A can tester, including a frame, a shaft secured to said frame, a wheel rotatable on said shaft for carrying cans from an intake chute to a discharge chute, said wheel having a hub, a stationary valve member mounted on said hub and splined to said frame and having air passages opening through a sealing face on said member, a bearing between said member and hub, a valve device rotatable with said wheel adjacent said member and having air passages opening through a sealing face on said device which are communicable with said stationary member passages as said wheel rotates to determine the supply and condition of air in cans clamped in leakproof relation on said wheel, a cap secured to said hub, a thrust member threaded on said cap, a thrust bearing engaging said thrust member, a retainer engaging said thrust bearing, and springs located between and bearing against said retainer and stationary member for urging said stationary member toward said valve device in order to hold said faces in slidable sealing engagement with each other.

ED LAXO.

REFERENCES CITED

The following references are of record in the file of this patent:

UNITED STATES PATENTS

| Number | Name | Date |
|---|---|---|
| 1,152,449 | Swangren | Sept. 7, 1915 |
| 2,020,535 | Cameron | Nov. 12, 1935 |
| 2,101,129 | Cameron | Dec. 7, 1937 |